United States Patent [19]
Le Sergent

[11] Patent Number: 5,192,350
[45] Date of Patent: Mar. 9, 1993

[54] METHOD OF FLAME FINISHING OPTICAL FIBER PREFORMS

[75] Inventor: Christian Le Sergent, Marcoussis, France

[73] Assignee: Alcatel Fibres Optiques, Bezons Cedex, France

[21] Appl. No.: 648,939

[22] Filed: Feb. 1, 1991

[30] Foreign Application Priority Data

Feb. 2, 1990 [FR] France .............................. 90 01237

[51] Int. Cl.$^5$ ........................................ C03B 37/025
[52] U.S. Cl. ................................. 65/3.11; 51/283 R;
65/2; 65/29; 65/61; 65/109; 65/162
[58] Field of Search ...................... 65/61, 29, 109, 120,
65/158, 160, 162, 163, 271, 13, 3.12, 3.2, 3.11, 2;
51/283 R

[56] References Cited

U.S. PATENT DOCUMENTS

| | | | |
|---|---|---|---|
| 2,710,512 | 6/1955 | Cronan | 51/283 |
| 3,811,857 | 5/1974 | Deeg et al. | 65/65 |
| 4,294,601 | 10/1981 | Dabby | 65/158 |
| 4,631,079 | 12/1986 | Clark | 65/13 |
| 4,875,916 | 10/1989 | Baltzer | 65/2 |

FOREIGN PATENT DOCUMENTS

| | | | |
|---|---|---|---|
| 2436111 | 5/1980 | France | 65/13 |
| 8200635 | 3/1982 | PCT Int'l Appl. | |

OTHER PUBLICATIONS

Tooley, The Handbook of Glass Manufacture, 1984, p. 103.

CRC Handbook of Chemistry and Physics, 1985, pp. B-138 and F56.

Okada, M. et al., Improved Chemical Vapour Deposition Method for Long-Length Optical Fibre, 16 Feb. 1978, Electronics Letters, vol. 14, pp. 89-90.

Electronics Letters, vol. 18, No. 17, Aug. 1982, pp. 771, 722, London, England; E. Modone et al.: "Low-Loss Fibres by a Pressurised MCVD Method".

Patent Abstracts of Japan, vol. 9, No. 78 (C-274) (1801), Apr. 6, 1985; & JP-A-59213637 (Showa Densen Denran K.K.).

Patent Abstracts of Japan, vol. 10, No. 136 (C-347) (2193), May 20, 1986; & JPA-A-60260429 (Hitachi Densen K.K.).

Patent Abstracts of Japan, vol. 10, No. 136 (C-347) (2193), May 20, 1986; & JP-A-60260439 (Hitachi Densen K.K.).

AT & T Technical Journal, vol. 65, No. 1, Jan.-Feb. 1986, pp. 56-61, Short Hills, N.J., USA; W. M. Flegal et al.: "Making Single-Mode Preforms by the MCVD Process".

Primary Examiner—Robert L. Lindsay
Attorney, Agent, or Firm—Sughrue, Mion, Zinn, Macpeak & Seas

[57] ABSTRACT

A cylindrical piece of glass (4) is subjected to heating passes on a glassmaker's lathe. Possible opto-geometrical defects of said piece of glass are detected and measured and then said defects are corrected by machining the outside surface thereof during a correction pass performed on the same glassmaker's lathe.

5 Claims, 1 Drawing Sheet

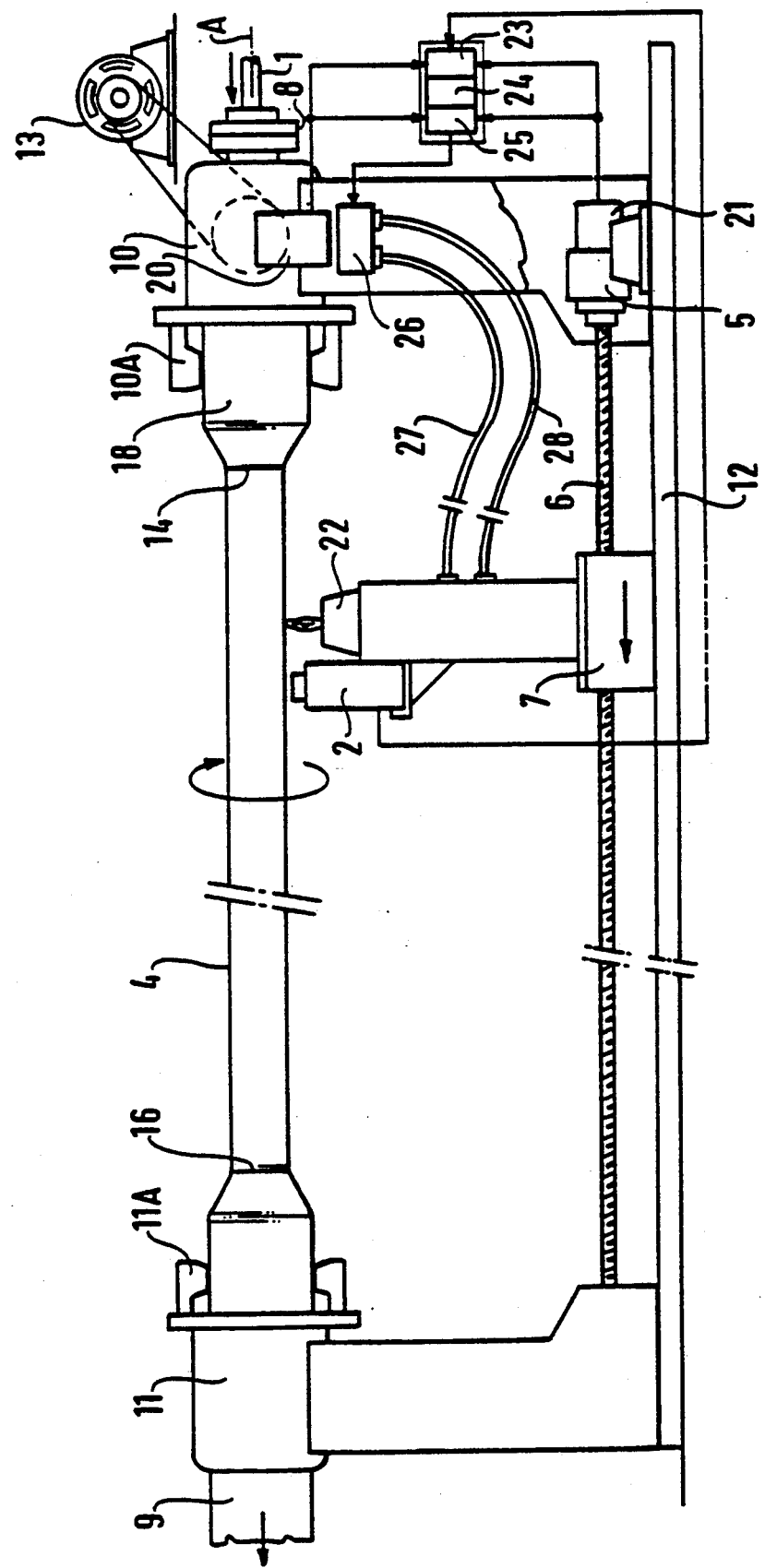

METHOD OF FLAME FINISHING OPTICAL FIBER PREFORMS

The present invention relates to manufacturing preforms from which optical fibers as actually used are drawn.

Such manufacture typically comprises the following steps:

installing an elongate tube blank made of silica on a glassmaker's lathe;

sweeping a gaseous mixture through the inside space of the tube;

rotating the tube;

displacing a torch longitudinally in one or more heating passes to heat successive areas of the outside surface of said tube to cause a deposit to be made in said areas from said gaseous mixture, thereby forming a continuous transparent inner layer on the inside surface of the tube;

forming other inner layers in analogous manner during other heating passes, said other inner layers having differing refractive indexes; and collapsing said tube during heating passes at a higher temperature than before, thereby forming a solid cylindrical preform.

Preforms are thus obtained by methods known under the initials MCVD, PCVD, etc. . . . , from which optical fibers are subsequently drawn by hot drawing.

It is desirable for optical fibers formed in this way to give rise to low losses only in the light they guide, particularly at the optical connections that need to be made with the fibers. For this to be possible, the core of the fiber must be well centered relative to the outside surface of the fiber and its diameter must be truly constant. In both cases, tolerances are of the order of a few hundreds of nanometers.

This can be achieved using solid preforms satisfying two criteria: core eccentricity relative to outside surface which is as small as possible; and a constant ratio between core diameter and the diameter of the outside surface.

In preforms manufactured using the methods of the type mentioned above, presently observable defects relating to these two criteria can be explained either by irregularities present in the tube blanks, or by irregularities relating to the depositing of the inner layers, or else by deformations occurring during the various steps of the method.

A particular object of the present invention is to enable preforms to be manufactured that are free from such defects.

To this end, the present invention provides a method of surface finishing optical fiber preforms having regular characteristics, wherein a cylindrical piece of glass is subjected to heating passes on a glassmaker's lathe, the method being characterized in that possible optogeometrical defects of said piece of glass are detected and measured when the glass is in the form of a solid preform that has finished being fabricated, and then said defects are corrected by machining the outside surface of said piece during a correction pass on said glassmaker's lathe.

Preferably, said defects of said piece of glass are detected and measured during a measurement pass on said glassmaker's lathe, after which said defects are corrected by thermal machining of the outside surface of said piece without dismounting it, this taking place during one of said heating passes which constitutes said correction pass. It should be understood that this correction pass may either be a pass which is distinct from said measurement pass, taking place after the measurement pass, or else it may be included in the same pass as said measurement pass, with correction operations taking place after measurement operations within the same pass.

The present invention will be better understood from the description given below made with reference to the accompanying FIGURE.

It should be understood that the items described and shown are given by way of non-limiting example.

The FIGURE is an elevation view of a glassmaker's bench for implementing the present invention.

The method of the invention is initially described in relatively general terms, with the various items used in the method being designated by the reference numbers that appear in the FIGURE.

The method comprises the following known operations:

said piece of glass 4 is installed on said glassmaker's lathe 10, 11, 12, said piece of glass having an axis A extending lengthwise and having an outside surface which is substantially a circular cylinder about said axis;

said lathe includes rotation means 10, 11, 13 to rotate said piece about said axis, a carriage 7 suitable for carrying a heater member 22 for heating an elementary area of said outside surface, and displacement means 5, 6, 12 for displacing said carriage longitudinally; and heating passes during each of which said lathe imparts a speed of rotation to said piece of glass and displaces said heater member at a longitudinal speed along said piece with said heater member heating said piece by applying heating power thereto, said speed of rotation, said longitudinal speed, and said heating power constituting heating parameters.

According to the present invention, said method further includes an opto-geometrical measurement pass which is performed after said installing operation by means of a measurement assembly including at least one measurement sensor for providing a set of measurement signals, the signals in said set being associated with respective elementary areas in a set of said areas covering said outside surface and being representative of possible optical and/or geometrical defects presented by said piece of glass in said elementary areas associated therewith. At least one of said heating passes preferably includes heating operations which are performed after said measurements signals have been provided during said opto-geometrical measurement pass, with the heating operations being performed in such a manner as to cause excess glass to be evaporated from the surface of said piece of glass. This heating pass thus constitutes a correction pass. It will nevertheless be understood that the surface of the piece of glass could be machined by means other than by evaporation, e.g. by chemical or mechanical abrasion. During said correction pass, a correction parameter (preferably constituted by at least one of said heating parameters) is controlled at all times as a function of said measurement signals, and preferably as a function of said signals that are associated with that one of said elementary areas which is being heated at that instant by said heater member, in such a manner as to correct said optical and/or geometrical defects presented by said piece of glass in said area.

In a little more detail, and preferably, said glassmaker's lathe 10, 11, 12, rotates said piece of glass 4 about said longitudinal axis A during said measurement pass, said lathe including:

a carriage 7 carrying at least one of said measurement sensors 2 and displacing said sensor longitudinally along the length of said piece of glass during said measurement pass, causing said measurement sensor to pass over a succession of said elementary areas of said outside surface and to provide a succession of primary measurement signals associated with said areas;

an angular measurement position sensor 20 and a longitudinal measurement position sensor 21 for providing coordinates which are associated at each instant with the same one of said elementary areas as said primary measurement signals being provided at said instant, and which constitute the angular and longitudinal coordinates of said area;

primary recording means 23 for recording said primary measurement signals in association with said coordinates;

calculation means 24 for reading said primary measurement signals and said associated coordinates and for providing in response thereto secondary measurement signals associated with said coordinates and representative of a correction to be applied to said piece of glass in said associated elementary areas;

secondary recording means 25 for recording said secondary measurement signal in association with said coordinates;

an angular heating position sensor 20 and a longitudinal heating position sensor 21 for providing coordinates at each instant during said correction pass, which coordinates are associated with said elementary area being heated by said heater member at said instant, and comprising the angular and longitudinal coordinates of said area; and control means 25, 26 connected to said heating position sensors 20, 21 to receive said coordinates at each instant during said correction operation, said control means also being connected to said secondary recording means 25 to read at each instant those of said secondary measurement signals which are associated with said coordinates received at said instant by said control means, said control means controlling said correction parameter at each instant as a function of said secondary measurement signals that it reads at said instant. To do this, the control means provide signals which may be constituted directly by said measurement signals or which may be generated on the basis thereof.

For reasons of simplicity, the same carriage 7 carries both said heater member 22 during said correction pass and said measurement sensor 2 during said measurement pass, and the same sensor 20 constitutes both said angular measurement position sensor and said angular heating position sensor, with another single sensor 21 constituting both said longitudinal measurement position sensor and said longitudinal heating position sensor.

Said primary and secondary recording means 23, 25 and said calculation means 24 are constituted by a digital computer.

During said correction pass the correction parameter is controlled in such a manner as to heat up those of said elementary areas which constitute correction areas sufficiently to remove an outside portion of the glass of said piece of glass by evaporation.

In greater detail, in a case given by example and shown in the FIGURE, said glassmaker's lathe comprises a headstock 10 and a tailstock 11 driven by a motor 13 and provided with respective jaws 10A and 11A for holding and rotating a tube blank 4 about a horizontal axis A. This tube is made of silica and constitutes said piece of glass. It is held by the jaws via silica connection sleeves which are welded to its upstream and downstream ends 14 and 16. A rotary inlet coupling 8 enables reactive gas mixtures to be delivered through the headstock 10.

The inlet and the outlet for the reactive gas mixtures are represented by arrows 1 and 9.

The glassmaker's lathe also includes a base plate 12 provided with a carriage 7 that moves longitudinally, i.e. parallel to the axis A, under drive from a drive screw 6 which is rotated by a motor 5 with which the longitudinal position sensor 21 is associated.

The operation of depositing an inner layer is performed, for example, by causing an appropriate reactive gas mixture to arrive via the rotary coupling 8, and by performing a pass with the heater member 22. This member is constituted by an oxygen and hydrogen torch fixed on the carriage 7. In some cases the reactive gas mixture may advantageously include liquid droplets in suspension, thereby constituting a mist.

A plurality of glass layer deposition operations are performed in similar manner in the context of the known MCVD deposition method used for manufacturing conventional preforms.

In order to perform the present invention in this context, an angle position sensor 20 is placed on the headstock 10.

The signals provided by the sensors 20 and 21 are transmitted to the computer 23, 24, 25 which controls a set of valves 26, thereby controlling the flow rates of oxygen and hydrogen delivered to the torch 22 via hoses 27 and 28.

During said correction pass, the torch is preferably a single-nozzle torch and it must have a short time constant (about one second) in response to the signals received from the computer 23, 24, 25. In contrast, during an inner layer deposition operation, it is preferable to use a multi-nozzle torch.

The FIGURE corresponds to the case where the correction parameter is a single parameter constituted by the heating power. Said control means are then constituted by the secondary recording means 25 and the set of valves 26. However, another such parameter or a plurality of such parameters in combination could be constituted by the speed of rotation and/or the longitudinal speed, with the recording means 25 then also being connected or being connected only to the motors 13 and/or 5.

In addition, the heater member could be constituted other than by a torch, e.g. it could be constituted by a carbon dioxide gas laser.

I claim:

1. A method of correcting the exterior surface of an optical fiber, solid cylindrical preform constituted by a cylindrical piece of glass made of silica and having an axis (A), comprising the following steps:

installing said piece of silica glass on a glassmaker's lathe, with said axis (A) extending lengthwise and with the exterior surface thereof substantially circularly cylindrical about said axis (A), said lathe including rotation means for rotating said piece of silica glass about said axis, a carriage for carrying an oxygen-hydrogen torch facing said glass piece exterior surface to flame heat an elementary area of said exterior surface, and displacement means for displacing said carriage longitudinally; and effecting multiple heating passes of said carriage and imparting a speed of rotation to said piece of glass and displacing said torch at a longitudinal speed along the length of said piece of glass, and heating said piece by applying a flame of said oxygen-hydrogen torch to the exterior surface of said cylindrical piece of silica glass while controlling the speed of rotation of said piece of glass, the longitudinal speed of said carriage and the heating power of said torch;

the improvement further comprising the step of performing an opto-geometrical measurement pass after said installation operation by means of a measurement assembly which includes at least one measurement sensor providing a set of measurement signals in which the signals from said assembly are associated with respective elementary areas in a set of such areas covering said exterior surface of said piece of glass, and are representative of optical and/or geometrical defects presented by said piece of glass in said elementary surface areas as outside projection portions of said silica glass, and wherein said method includes, for at least one of said multiple heating passes, effecting a correction heating pass subsequent to the provision of said measurement signals during said opto-geometrical measurement pass and evaporating said outside projection portions of said silica glass by applying said oxygen-hydrogen torch flame to the surface of said glass piece;

at least one of said heating parameters constituting a correction parameter, and said method further comprises controlling said correction parameter at each instant during said correction heating pass as a function of said measurement signals associated with said one elementary area being heated at said instant by said torch to correct said optical and/or geometrical defect presented by said piece of silica glass in said one area by flame vaporization removal of the excess glass from the surface of said glass piece.

2. A method according to claim 1, further comprising; controlling the correction parameter during the correction pass so as to heat those of said elementary areas constituting areas to be corrected and thereby removing outside projection portions of the exterior surface of the piece of glass (4) by applying an oxygen and hydrogen torch (22) flame to said areas to be corrected, thereby removing said glass outside projection portions by flame vaporization.

3. A method according to claim 1, wherein said step of imparting a speed of rotation to said piece of glass comprises:

rotating said piece of glass about said longitudinal axis (A) during said measurement pass, thereby causing said measurement sensor to pass over a succession of said elementary areas of said outside surface and to provide a succession of primary measurement signals associated with said areas;

operating an angular measurement position sensor (20) and a longitudinal measurement position sensor (21) and providing coordinates associated at each instant with a same one of said elementary areas as said primary measurement signals being provided at said instant, thereby constituting angular and longitudinal coordinates of said area;

recording said primary measurement signals in association with said coordinates;

reading said primary measurement signals and said associated coordinates and providing in response thereto secondary measurement signals associated with said coordinates and representative of a correction to be applied to said piece of glass in said elementary areas associated with said signals and said coordinates;

recording said secondary measurement signals in association with said coordinates;

providing coordinates through said angular heating position sensor (20) and said longitudinal heating position sensor (21) during said correction pass, which correction pass coordinates are associated with said elementary area being heated by said torch at said instant, and comprising the angular and longitudinal coordinates of said area; and receiving said coordinates at each instant during said correction operation from said heating position sensors (20, 21) and reading via said control means connected to secondary recording means (25) at each instant said secondary measurement signals associated with said coordinates received at said instant by said control means, and controlling a correction parameter at each instant as a function of those of said secondary measurement signals being read at said instant.

4. A method according to claim 3, further comprising the step of moving both said torch and said measurement sensor (2) on a same carriage during said correction pass and during said measurement pass and using a single sensor constituting both said angular measurement position sensor and said angular heating position sensor (20), and a single sensor (21) constituting both said longitudinal measurement position sensor and said longitudinal heating position sensor to provide said coordinates at each instant during said correction pass and said measurement pass.

5. A method according to claim 3, wherein said steps of recording said primary measurement signals and said secondary measurement signals and for reading said primary measurement signals are effected by operating a digital computer.

* * * * *